United States Patent [19]

Yokoyama et al.

[11] 3,883,586

[45] May 13, 1975

[54] PROCESS FOR PREPARING ESTERS OF OMEGA-AMINODODECANOIC ACID

[75] Inventors: Iwao Yokoyama; Hiroo Sasaki; Tetsuo Tanaka; Keiichi Kihara, all of Shin-nanyo, Japan

[73] Assignee: Toyo Soda Manufacturing Co., Ltd., Japan

[22] Filed: Feb. 15, 1974

[21] Appl. No.: 442,883

[30] Foreign Application Priority Data
Mar. 19, 1973 Japan.................................. 48-3086

[52] U.S. Cl. ............................................... 260/404
[51] Int. Cl.......................................... C07c 101/18
[58] Field of Search .................................... 260/404

[56] References Cited
UNITED STATES PATENTS 3,639,436  2/1972  Holtz .............................. 260/404 X
3,772,358  11/1973  Lang.................................. 260/404

Primary Examiner—Patrick P. Garvin
Attorney, Agent, or Firm—Oblon, Fisher, Spivak, McClelland & Maier

[57] ABSTRACT

ω-Aminododecanoic acid esters having the formula $H_2N-(CH_2)_{11}COOR_3$ wherein $R_3$ represents a saturated $C_{1-4}$ alkyl group are prepared by reacting an ω-nitrocarboxylic acid ester having the formula $O_2N-(CH_2)_3-R_1-(CH_2)_2-R_2-(CH_2)_3COOR_3$ wherein $R_1$ and $R_2$ are both $-CH_2-CH_2-$ or $-CH=CH-$, or $R_1$ is $-CH_2CH_2-$ when $R_2$ is $-CH=CH-$ or $R_1$ is $-CH=CH-$ when $R_2$ is $-CH_2CH_2-$, and $R_3$ represents a saturated $C_{1-4}$ alkyl group, with hydrogen in a hydrocarbon solvent in the presence of a palladium, platinum or nickel hydrogenation catalyst.

10 Claims, No Drawings

PROCESS FOR PREPARING ESTERS OF OMEGA-AMINODODECANOIC ACID

BACKGROUND OF THE INVENTION

1. Field of the Invention

The present invention relates to the hydrogenation of esters of saturated or unsaturated, straight chain ω-nitrocarboxylic acids having 12 carbon atoms. More particularly, the present invention relates to a process for preparing ω-aminododecanoic acid esters by the hydrogenation of ω-nitrocarboxylic acid esters with a hydrogenation catalyst in a hydrocarbon solvent.

2. Description of the Prior Art

Previously, ω-aminododecanoic acid, which is an important raw material for nylon 12 as well as lauryllactam, has been prepared by hydrolyzing esters of ω-aminododecanoic acid, although nylon -12 can also be prepared by polymerizing ω-aminododecanoic acid esters.

Recently studies have been conducted concerning the preparation of ω-aminododecanoic acid by the hydrogenation of ω-nitrododecanoic acid. However, the solubility of ω-aminododecanoic acid in solvents is usually low which makes separation of the catalyst from the product after the hydrogenation difficult. Many times this results in incomplete hydrogenation of the nitro acid. Thus, it has been difficult to obtain ω-aminododecanoic acid in high yield by the hydrogenation of ω-nitrododecanoic acid.

A need, therefore, exists for a method of efficiently and completely reducing ω-nitrododecanoic acid to ω-aminododecanoic acid.

SUMMARY OF THE INVENTION

Accordingly, one object of the present invention is to provide a process for preparing ω-aminododecanoic acid esters in high yield and high purity from ω-nitrocarboxylic acid esters.

Briefly, this object and other objects of the invention as hereinafter will become more readily apparent can be attained by preparing ω-aminododecanoic acid esters having the formula $H_2N—(CH_2)_{11}COOR_3$ wherein $R_3$ represents a saturated $C_{1-4}$ alkyl group by reacting an ω-nitrocarboxylic acid ester having the formula $O_2N—(CH_2)_3—R_1—(CH_2)_2—R_2—(CH_2)_2COOR_3$ wherein $R_1$ and $R_2$ are both $—CH_2—CH_2—$ or $—CH=CH—$, or $R_1$ is $—CH_2CH_2—$ when $R_2$ is $—CH=CH—$ $R_1$ is $—CH=CH—$ when $R_2$ is $—CH_2CH_2—$, and $R_3$ represents a saturated $C_{1-4}$ alkyl group, with hydrogen in a hydrocarbon solvent in the presence of a palladium, platinum or nickel hydrogenation catalyst.

DETAILED DESCRIPTION OF THE PREFERRED EMBODIMENTS

In the process of the invention, the starting ω-nitro, C-12 carboxylic acid esters and the product ω-aminododecanoic acid esters produced by the hydrogenation reaction can be dissolved in a suitable hydrocarbon solvent in high concentrations. Since hydrocarbon solvents can be used in the hydrogenation reaction, production of by-products is minimal and the esters of ω-aminododecanoic acid produced can be obtained in yields 7–15 percent higher than comparable processes in which alcohol solvents are used which are conventional solvent media for the hydrogenation of these compounds. If the concentration of the starting ester of ω-nitro, C-12 carboxylic acid is low, relatively high yields of the final product can be obtained even though an alcohol solvent is used. However, if the concentration of the starting material is increased, the yields of the product ω-aminododecanoic acid esters is decreased if an alcohol solvent is used. However, high yields of ω-aminododecanoic acid esters can be maintained at higher concentration levels when a hydrocarbon solvent is used even though the concentration of the starting material is very high.

The esters of the ω-nitro, C-12 carboxylic acids used as the starting material include the esters of a ω-nitro C-12 carboxylic acid and a $C_{1-4}$ lower alcohol such as methyl ω-nitrododecanoate, ethyl ω-nitrododecanoate, propyl ω-nitrododecanoate, butyl ω-nitrododecanoate and the methyl, ethyl, propyl and butyl esters of ω-nitro-4-dodecenoic acid, ω-nitro-8-dodecenoic acid, ω-nitro-4, 8-dodecadienoic acid and mixtures thereof. These starting materials can be easily prepared by a ring cleavage reaction of an α-nitroketone in an alcohol solvent with an alkaline catalyst after the α-nitroketone is prepared by the reaction of nitrogen peroxide and oxygen with cyclododecatriene, cyclododecadiene, cyclododecene or mixtures thereof.

In a preferred embodiment for the reduction process of the invention, an ω-nitro C-12 carboxylic acid ester, a hydrocarbon solvent and a catalyst are charged into an autoclave, and hydrogen is added thereto under pressure. The mixture is heated with stirring to conduct the reaction at a temperature from room temperature to 150°C, preferably 40° to 120°C, for 1 to 10 hours. After the reaction, hydrogen is discharged and the reaction mixture is cooled without precipitation of the product depending upon the concentration of the reaction mixture. The catalyst is then separated by filtration and the solvent is removed by distillation leaving the ester of ω-aminododecanoic acid as the product.

The hydrocarbon solvents used in the invention include $C_{5-16}$ aliphatic saturated hydrocarbons, acyclic saturated hydrocarbons, and aromatic hydrocarbons. Hydrocarbons containing less than 5 carbon atoms have too low a boiling point to be useful as a solvent in the present reaction system. On the other hand, hydrocarbons having more than 16 carbon atoms have too high a boiling point which makes a separation and recovery of the solvent difficult. The latter solvents, however, do not adversely affect the reaction itself, and accordingly it is possible to use them. Suitable solvents include aliphatic hydrocarbons such as pentane, hexane, heptane, octane, dodecane and hexadecane and branched chain derivatives thereof; alicyclic saturated hydrocarbons such as cyclohexane, cyclooctane and cyclododecane; aromatic hydrocarbons such as benzene, toluene, xylene and ethylbenzene and mixtures thereof. It is very important to use a hydrocarbon solvent in the process of the invention. High yields of the product esters of ω-aminododecanoic acid can be obtained even though the concentration of the nitrocarboxylic acid starting material is high when a hydrocarbon solvent is used.

The hydrogenation catalysts used in the process of the invention include the conventional palladium catalysts, platinum catalysts, and nickel catalysts such as active carbon coated with palladium, palladium black, palladium oxide; alumina coated with palladium, platinum black, platinum oxide; and active carbon coated with platinum, Raney nickel, Urushibara nickel, stabilized nickel, and the like. The catalysts can contain a promoter or another metal for certain purposes. The amount of the palladium or platinum type catalyst used is usually in the range of from 0.001 to 2 percent by weight, preferably 0.01 to 0.5 percent by weight as the metal based on the amount of ester of the ω-nitro C-12 carboxylic acid used. The amount of the nickel type catalyst used usually ranges from 0.01 to 5 percent by weight, preferably 0.10 to 1.0 percent by weight based on the ester of the ω-nitro C-12 carboxylic acid. Although various hydrogenation catalysts can be used, it is especially preferable to use a palladium type catalyst from the viewpoint of catalytic activity and yield of product ω-aminododecanoic acid.

In the process of the invention, hydrogen can be introduced into the reaction system at any pressure. Pressures greater than atmospheric pressure, preferably 2 to 100 atmospheres, especially 5 to 50 atmospheres are usually employed. The reaction temperature usually employed ranges from 10° to 150°C, preferably 40°–120°C. Further, the concentration of the ester of the ω-nitro C-12 carboxylic acid employed usually ranges from 2–50 percent by weight, preferably 10 to 30 percent by weight.

In accordance with the process of the invention, the ester of the ω-nitro C-12 carboxylic acid used can be selectively hydrogenated in a hydrocarbon solvent, which provides economic advantages, in high concentrations using only small amounts of catalyst, thus affording a convenient, economic route to the esters of ω-aminododecanoic acid which is a useful raw material for nylon-12.

When a high purity ester of an ω-nitro C-12 carboxylic acid is used as the starting material, high purity, white colored esters of ω-aminododecanoic acid can be prepared. The resulting esters of ω-aminododecanoic acid can be polymerized without further purification to obtain high purity, white nylon-12.

Having generally described the invention, a further understanding can be obtained by reference to certain examples which are provided herein for purposes of illustration only and are not intended to be limiting unless otherwise specified.

EXAMPLE 1

Into a 200 cc autoclave equipped with an electromagnetic stirrer were charged 18.0 g of methyl ω-nitrododecanoate, 96 ml of n-hexane as a solvent, and 0.4 g of Raney nickel as a catalyst. The autoclave was closed and was purged with hydrogen several times. Thereafter, the stirred mixture was heated at 80°C and hydrogen was introduced to a pressure of 30 atms to initiate the reaction. During the reaction, hydrogen was continuously introduced to maintain a pressure of 30 atms. The reaction was continued for 6 hours and then hydrogen was released. The reaction mixture was removed from the autoclave and the catalyst was separated by filtration. The solvent was removed by distillation at relatively low temperature whereby 15.8 g of a white powdery product was obtained.

The infrared spectrum of the product and the gas chromatogram of the acetylated derivative of the product showed that the conversion of methyl ω-nitrododecanoate was 98.0 percent and the selectivity to methyl ω-aminododecanoate was 92.1 percent. The resulting crude methyl ω-aminododecanoate was recrystallized from n-hexane. The calculated and found elemental analytical data for the purified methyl ω-aminododecanoate is shown below. The ω-aminododecanoic acid prepared by the hydrolysis of the resulting methyl ω-aminododecanoate had a melting point of 184°C and an infrared spectrum which corresponded to a sample of the known acid. Elemental analysis:

|  | C(wt.%) | H(wt.%) | N(wt.%) |
|---|---|---|---|
| Calculated | 68.07 | 11.86 | 6.10 |
| Found | 68.01 | 11.80 | 5.98 |

Reference 1

The hydrogenation procedure of methyl ω-nitrododecanoate of Example 1 was repeated except that methyl alcohol was used instead of n-hexane. The reaction was completed in 4 hours and the reaction mixture was treated as described in Example 1 whereby 15.6 g of product was obtained. According to an analysis of the product, the conversion of methyl ω-nitrododecanoate was 100 percent but the selectivity for methyl ω-aminododecanoate was 81.0 percent.

EXAMPLE 2

The hydrogenation of ethyl ω-nitrododecanoate was conducted as set forth in Example 1 except that 18.0 g of ethyl ω-nitrododecanoate was reduced in the presence of 0.2 g of platinum oxide as a catalyst at 60°C. The reaction was continued for 6 hours and the reaction mixture was treated as described in Example 1, whereby 15.9 g of the product were obtained. According to the analysis of the product, the conversion was 97.3 percent and the selectivity to product was 91.2 percent.

Reference 2

The hydrogenation of ethyl ω-nitrododecanoate of Example 2 was repeated except that n-hexane was replaced with 96 ml of ethyl alcohol. The reaction was completed after 4 hours and the reaction mixture was treated as described in Example 1 whereby 15.8 g of the product were obtained. According to an analysis of the product, the conversion of the nitro ester was 100 percent but the selectivity to amino product was 83.3 percent.

EXAMPLE 3

The hydrogenation of methyl ω-nitrododecanoate was repeated as described in Example 1 except that 6.0 g of methyl ω-nitrododecanoate and 0.1 g of active carbon coated with 5 percent palladium as a catalyst was used. The reaction was continued for 3 hours and the reaction mixture was treated as described in Example 1, whereby 5.3 g of a product was obtained. According to an analysis of the product, the conversion of nitro ester was 100 percent and the selectivity to product was 96.4 percent.

EXAMPLE 4

The hydrogenation of n-butyl ω-nitrododecanoate was conducted as set forth in Example 1 except that 12.0 g of n-butyl ω-nitrododecanoate was reacted in the presence of 0.2 g of active carbon coated with 5 percent of palladium as a catalyst at 100°C. The reaction was completed after 3 hours and thereafter the reaction mixture was treated as described in Example 1 whereby 10.7 g of the product was obtained. According to an analysis of the product, the conversion of nitro ester was 100 percent and the selectivity to product was 94.3 percent.

EXAMPLE 5

The hydrogenation of methyl ω-nitrododecanoate was repeated as described in Example 1 except that 38.0 g of methyl ω-nitrododecanoate was reacted in the presence of 0.2 g of active carbon coated with 5 percent of palladium as the catalyst. The reaction was continued for 6 hours and the reaction mixture was treated as described in Example 1 whereby 33.5 g of the product was obtained. According to an analysis of the product, the conversion of nitro ester was 100 percent and the selectivity to product was 97.4 percent.

Reference 3

The hydrogenation of methyl ω-nitrododecanoate was repeated as described in Example 5 except that methyl alcohol was used instead of n-hexane. The reaction was completed after 5 hours and the reaction mixture was treated as described in Example 1 whereby 33.5 g of the product were obtained. According to an analysis of the product, the conversion of nitro ester was 100 percent, but the selectivity to product was only 79.4 percent.

EXAMPLE 6

The hydrogenation of methyl ω-nitro-4, 8-dodecadienoate was conducted as set forth in Example 1 except that 38.0 g of methyl ω-nitro-4, 8-dodecadienoate was reacted in 96 ml of n-heptane as a solvent in the presence of 0.2 g of active carbon coated with 5 percent palladium at 100°C. The reaction was completed after 4 hours, and the reaction mixture was treated as described in Example 1, whereby 33.9 g of the product was obtained. According to an analysis of the product, the conversion of nitro ester was 100 percent and the selectivity to product was 96.7 percent.

EXAMPLE 7

The hydrogenation of n-butyl ω-nitro-4, 8-dodecadienoate was conducted as set forth in Example 1 except that 38.0 g of n-butyl ω-nitro-4, 8-dodecadienoate was reacted at 100°C. The reaction was continued for 8 hours and the reaction mixture was treated as described in Example 1 whereby 34.1 g of the product were obtained. According to an analysis of the product, the conversion of nitro ester was 100 percent and the selectivity to product was 91.9 percent.

EXAMPLE 8

The hydrogenation of a mixture of methyl ω-nitro-4-dodecenoate and methyl ω-nitro-8-dodecenoate was conducted as set forth in Example 1 except that 6 g of a mixture of methyl ω-nitro-4-dodecenoate and methyl ω-nitro-8-dodecenoate in 96 ml of cyclohexane as the solvent was reacted in the presence of 0.2 g of palladium black as the catalyst at 60°C. The reaction was continued for 3 hours and the reaction mixture was treated as described in Example 1 whereby 5.3 g of the product were obtained. According to an analysis of the product, the conversion of nitro ester was 100 percent and the selectivity to product was 94.7 percent.

EXAMPLE 9

The hydrogenation of methyl ω-nitro-4, 8-dodecadienoate was conducted as set forth in Example 1 except that 12.0 g of methyl ω-nitro-4, 8-dodecadienoate in 96 ml of benzene as a solvent was reacted in the presence of 0.2 g of palladium oxide as a catalyst. The reaction was continued for 5 hours and the reaction mixture was treated as described in Example 1 whereby 10.6 g of the product were obtained. According to an analysis of the product, the conversion of nitro ester was 100 percent and the selectivity to product was 93.8 percent.

EXAMPLE 10

The hydrogenation of methyl ω-nitrododecanoate was repeated as described in Example 1 except that the reaction was conducted in 96 ml of toluene as a solvent in the presence of 0.2 g of platinum black as the catalyst at 100°C. The reaction was continued for 3 hours and the reaction mixture was treated as described in Example 1, whereby 15.7 g of the product were obtained. According to an analysis of the product, the conversion of nitro ester was 100 percent and the selectivity to product was 92.8 percent.

EXAMPLE 11

The hydrogenation of a mixture of esters of ω-nitro C-12 carboxylic acids was conducted as set forth in Example 1 in which 38.0 g of a mixture of 30.0 g of methyl ω-nitrododecanoate, 5.5 g of a mixture of methyl ω-nitro-4-dodecenoate and methyl ω-nitro-8-dodecenoate and 2.5 g of methyl ω-nitro-4, 8-dodecadienoate was reacted in 96 ml of heptane as a solvent in the presence of active carbon coated with 5 percent of palladium as a catalyst. The reaction was continued for 6 hours and the reaction mixture was treated as described in Example 1, whereby 33.6 g of the product was obtained. According to an analysis of the product, the conversion of nitro ester mixture was 100 percent and the selectivity to product was 95.6 percent.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing an ω-aminododecanoic acid ester having the formula $$H_2N-(CH_2)_{11}COOR_3$$

wherein $R_3$ represents a saturated $C_{1-4}$ alkyl group; which comprises the step of: reacting an ω-nitrocarboxylic acid ester having the formula $$O_2N-(CH_2)_3-R_1-(CH_2)_2-R_2-(CH_2)_2-COOR_3$$

—CH=CH—, or $R_1$ is —CH$_2$CH$_2$— when $R_2$ is —CH=CH— or $R_1$ is —CH=CH— when $R_2$ is —CH$_2$CH$_2$— and $R_3$ represents a saturated $C_{1-4}$ alkyl group, with hydrogen in a hydrocarbon solvent in the presence of a palladium, platinum or nickel hydrogenation catalyst.

solvent is an aliphatic hydrocarbon, an alicyclic hydrocarbon or an aromatic hydrocarbon all of which have from 5 to 16 carbon atoms.

3. The process of claim 2, wherein said aromatic hydrocarbon solvent is benzene, toluene, xylene, ethylbenzene or mixtures thereof.

4. The process of claim 2, wherein said alicyclic saturated hydrocarbon is cyclohexane, cyclooctane or cyclododecane.

5. The process of claim 2, wherein said aliphatic hydrocarbon solvent is pentane, hexane, heptane, octane, dodecane or cyclododecane.

6. The process of claim 1, wherein said reaction is conducted under a hydrogen pressure of 2 to 100 atms, and the reaction is conducted at a temperature of from 10° to 150°C.

7. The process of claim 1, wherein said ester of an ω-nitrocarboxylic acid is dissolved in said hydrocarbon solvent at a concentration of 2 to 50 percent by weight, and the reaction is continued until a 100 percent conversion of said ω-nitrocarboxylic acid is attained.

8. The process of claim 1, wherein said ω-nitrocarboxylic acid ester is a $C_{1-4}$ lower alcohol ester of ω-nitrododecanoic acid, ω-nitro-4-dodecenoic acid, ω-nitro-8-dodecenoic acid, ω-nitro-4, 8-dodecadienoic acid or mixtures thereof.

9. The process of claim 1, wherein said hydrogenation catalyst is active carbon coated with palladium, palladium black, palladium oxide, platinum, Raney nickel, or Urushibara nickel.

10. The process of claim 1, wherein said hydrogenation catalyst is alumina coated with palladium, platinum black or platinum oxide.

* * * * *